United States Patent
Ahmed et al.

(10) Patent No.: US 12,459,834 B1
(45) Date of Patent: Nov. 4, 2025

(54) NANOCOMPOSITE FOR WASTEWATER TREATMENT

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/216,531

(22) Filed: May 22, 2025

(51) Int. Cl.
  *C01G 23/08* (2006.01)
  *B01J 20/20* (2006.01)
  (Continued)

(52) U.S. Cl.
  CPC ............ *C01G 23/08* (2013.01); *B01J 20/205* (2013.01); *B01J 20/28007* (2013.01); *B01J 20/3078* (2013.01); *B82Y 30/00* (2013.01); *C02F 1/281* (2013.01); *C01P 2002/01* (2013.01); *C01P 2002/60* (2013.01); *C01P 2002/76* (2013.01); *C01P 2002/85* (2013.01); *C01P 2004/03* (2013.01); *C01P 2004/04* (2013.01); *C01P 2004/32* (2013.01); *C01P 2004/38* (2013.01);
  (Continued)

(58) Field of Classification Search
  None
  See application file for complete search history.

(56) References Cited

FOREIGN PATENT DOCUMENTS

| CN | 105688937 A | 6/2016 |
|---|---|---|
| CN | 106040262 A | 10/2016 |

(Continued)

OTHER PUBLICATIONS

Matsukevich et al (âPhotocatalytic degradation of polycyclic aromatic hydrocarbons under visible light irradiation in water using TiO2/MgO nanocompositesâ, Env. Sci. Pollution Research (2025) 32: 5628-5637 published on Feb. 13, 2025) (Year: 2025).*

(Continued)

*Primary Examiner* — Michael Forrest
(74) *Attorney, Agent, or Firm* — Oblon, McClelland, Maier & Neustadt, L.L.P.

(57) ABSTRACT

A method of remediating a contaminated aqueous medium includes contacting the aqueous medium with an amount of a particulate nanocomposite material that contains elemental carbon (C); an orthorhombic titanium dioxide ($TiO_2$); a tetragonal $TiO_2$ crystalline phase; a cubic cadmium oxide (CdO) crystalline phase; a hexagonal magnesium titanate ($MgTiO_3$) crystalline phase; and, an orthorhombic magnesium titanate oxide ($Mg_{0.6}Ti_{2.4}O_5$). Based on the total number of atoms in the nanocomposite material and as determined by energy dispersive X-ray spectroscopy, the nanocomposite material has an atomic concentration of carbon (C) of from about 1 atomic percent (at. %) to about 5 at. %; an atomic concentration of magnesium (Mg) of from about 5 to about 15 at. %; an atomic concentration of titanium (Ti) of from about 15 to about 30 at. %; and, an atomic concentration of cadmium (Cd) of from about 1 to about 10 at. %.

20 Claims, 5 Drawing Sheets

(51) Int. Cl.
- *B01J 20/28* (2006.01)
- *B01J 20/30* (2006.01)
- *B82Y 30/00* (2011.01)
- *C02F 1/28* (2023.01)

(52) U.S. Cl.
CPC ...... *C01P 2004/50* (2013.01); *C01P 2004/64* (2013.01); *C01P 2004/82* (2013.01)

(56) References Cited

FOREIGN PATENT DOCUMENTS

| | | |
|---|---|---|
| CN | 114605086 A | 6/2022 |
| WO | 2013/141570 A1 | 9/2013 |

OTHER PUBLICATIONS

Ashoka CH, et al., "Synthesis and Characterization of MgO/TiO2 Nanocomposites", Journal of Nanomedicine & Nanotechnology, vol. 2015, Issue 6, Oct. 1, 2015, 5 pages.

\* cited by examiner

NANOCOMPOSITE FOR WASTEWATER TREATMENT

BACKGROUND

Technical Field

The present disclosure is directed towards a method of remediating a contaminated aqueous medium through adsorption and/or irradiation of pollutants onto a particulate nanocomposite material. The present disclosure is further directed to a method of treatment of contaminated water using the particulate crystalline nanocomposite and to a method of preparation of the nanocomposite.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Surging industrialization and urban expansion have intensified the release of waste inorganic and organic contaminants or pollutants into the environment, overwhelming natural purification processes and endangering environmental health. As these contaminants infiltrate water and soil systems, they disrupt ecological balance and pose significant risks to human well-being. Heavy metal ions, such as cadmium (Cd), chromium (Cr), copper (Cu), iron (Fe), lead (Pb), zinc (Zn), and uranium (U), are particularly concerning due to their toxicity, carcinogenicity, and non-biodegradability. Industries such as chemicals, textiles, plastics, mining, and paper contribute significantly to heavy metal pollution, with untreated discharge endangering aquatic ecosystems and becoming hazardous at high concentrations. Addressing these challenges requires innovative treatment technologies capable of effectively removing and, where possible, degrading contaminants into harmless constituents, ensuring sustainable water management.

Traditional processes such as coagulation, clarification, filtration, and sterilization primarily target suspended solids and microbial contaminants but demonstrate limited efficiency in eliminating dissolved inorganic species, dissolved organic matter and organic matter in colloidal suspension. These limitations restrict the applicability of the known processes in treating highly contaminated wastewater. To overcome this challenge, nanocomposite-based immobilization techniques integrate adsorption, catalytic degradation, and ion exchange mechanisms, effectively capturing and neutralizing persistent contaminants. By incorporating nanomaterials with a high surface area and tailored functional properties, such an approach improves contaminant retention, promotes the breakdown of organic contaminants, and can enhance desalination efficiency. Further photocatalytically active nanocomposites have emerged as sustainable remediative materials, leveraging light-driven reactions to degrade contaminants into harmless by-products, and offering a cost-effective and eco-friendly solution for water purification.

Sunlight-driven photocatalytic technology is widely applied in advanced wastewater treatment and reuse. However, continuous illumination is essential for photocatalysis, given that a lack of light halts electron-hole pair generation, ceasing activity. Since sunlight cannot be stored, solar-driven photocatalysis may become ineffective in the absence of light. To mitigate this challenge, advancements in photocatalyst design, such as heterojunction formation, doping, and surface modification, have been explored to enhance charge separation, extend light absorption, and improve stability, ensuring more reliable and prolonged photocatalytic activity. Despite significant advancements, challenges persist, including limited visible-light absorption, low efficiency, and poor stability. It is considered that future research should focus on enhancing light absorption, charge separation, and catalyst durability. Moreover, synthesizing nanocomposites can pose challenges due to the high-temperature requirements of synthetic processes and lengthy processing times; moreover, the obtained nanocomposites are often characterized by irregular particle sizes or morphology. Additionally, several techniques often result in inconsistent porosity affecting the overall performance of such nanocomposites in adsorption.

A key advantage of multiphase nanocomposites is their ability to suppress grain growth during thermal processing, ensuring long-term stability and superior performance. Research efforts have explored different material systems, but such materials often lack the required multifunctionality for addressing complex environmental and industrial challenges. Accordingly, there has been a growing focus on integrating diverse crystalline phases into a single nanostructured material, leveraging synthesis techniques such as sol-gel processing, combustion methods, and hydrothermal synthesis. These approaches enable precise control over composition, phase distribution, and morphology, paving the way for next-generation multifunctional materials.

Despite progress in fabrication techniques, significant hurdles remain in achieving structural uniformity, cost efficiency, and large-scale production. Traditional methods, such as high-energy ball milling, are effective in incorporating different nanophases but often introduce inconsistencies in particle distribution. Additionally, ultrasonic and high-shear mixing techniques enhance dispersion but present challenges in handling, requiring further advancements in fabrication technology.

Another major challenge lies in the practical implementation of these materials, particularly in areas such as heavy metal adsorption, contaminant (pollutant) removal, and advanced energy storage. Many existing solutions are hindered by limited adsorption capacity, high synthesis costs, and energy-intensive processes, making large-scale deployment difficult. Furthermore, the intricate chemical and thermal interactions within multiphase systems complicate the development of materials with consistent performance across different applications. Addressing these limitations requires a shift toward cost-effective, high-performance nanocomposites with improved phase composition, enhanced conductivity, and tailored surface properties.

By overcoming these challenges, multiphase nanocomposites can revolutionize various technological sectors, offering breakthroughs in environmental sustainability, energy conversion, and next-generation functional materials. Future research must focus on scalable synthesis routes, precise phase engineering, and improved processing techniques to fully harness the potential of these advanced materials in real-world applications.

Accordingly, one object of the present disclosure is to provide a particulate nanocomposite material, and method of preparation thereof, wherein the particulate nanocomposite has utility in immobilizing inorganic contaminants and degrading organic contaminants present in a contaminated aqueous medium, and which particulate nanocomposite may circumvent the above listed drawbacks and limitations of the materials and methods already known in the art.

SUMMARY

In an exemplary embodiment, a method of remediating a contaminated aqueous medium is described, the method comprising contacting the aqueous medium with an amount of a particulate nanocomposite material. The particulate nanocomposite material comprises: elemental carbon (C); an orthorhombic titanium dioxide ($TiO_2$) crystalline phase; a tetragonal $TiO_2$ crystalline phase; a cubic cadmium oxide (CdO) crystalline phase; a hexagonal magnesium titanate ($MgTiO_3$) crystalline phase; and, an orthorhombic magnesium titanate oxide ($Mg_{0.6}Ti_{2.4}O_5$). Further, based on the total number of atoms in the nanocomposite material and as determined by energy dispersive X-ray spectroscopy (EDX), the particulate nanocomposite material has: an atomic concentration of carbon (C) of from about 1 atomic percent (at. %) to about 5 at. %; an atomic concentration of magnesium (Mg) of from about 5 at. % to about 15 at. %; an atomic concentration of titanium (Ti) of from about 15 at. % to about 30 at. %; and, an atomic concentration of cadmium (Cd) of from about 1 at. % to about 10 at. %.

In an exemplary embodiment, a method of immobilizing inorganic contaminants disposed in an aqueous medium. The method includes contacting the aqueous medium with the aforementioned particulate nanocomposite material.

In another exemplary embodiment, a method of degrading organic contaminants disposed in an aqueous medium. The method includes contacting the aqueous medium with the aforementioned particulate nanocomposite material while irradiating the aqueous medium with actinic irradiation.

In an embodiment, the amount of the particulate nanocomposite material is from about 0.05 to about 1 wt. %, based on the weight of the aqueous medium.

In an embodiment, the aqueous medium is provided as a static volume in which the amount of the particulate nanocomposite material is dispersed.

In another embodiment, the aqueous medium is provided as a flow which contacts the amount of the particulate nanocomposite material. In a particular embodiment, at least a fraction of the amount of the particulate nanocomposite material is retained within a membrane and the aqueous medium contacts the membrane as a perpendicular flow stream. In another exemplary embodiment, at least a fraction of the amount of particulate nanocomposite material is retained within a membrane and the aqueous medium contacts the membrane as a tangential flow stream.

In some embodiments, the particulate nanocomposite material has, based on the total number of atoms in the nanocomposite material: an atomic concentration of carbon (C) of from about 1 at. % to about 3 at. %; an atomic concentration of magnesium (Mg) of from about 6 to about 12 at. %; an atomic concentration of titanium (Ti) of from about 18 at. % to about 24 at. %; and, an atomic concentration of cadmium (Cd) of from about 1 at. % to about 6 at. %.

In some embodiments, the particulate nanocomposite material has a volume average crystallite size, as determined by X-ray diffraction, of from about 55 nm to about 65 nm.

In some embodiments, the particulate nanocomposite material has a volume average crystallite size, as determined by X-ray diffraction, of from about 58 nm to about 60 nm.

In some embodiments, the particulate nanocomposite material has a heterogeneous morphology comprising cuboid particles and agglomerates of substantially spherical particles.

In some embodiments, the particulate nanocomposite material includes a fraction of the cuboid particles have a particle size greater than about 1 micrometer (μm), as determined by scanning electron microscopy (SEM).

In some embodiments, the particulate nanocomposite material includes a fraction of the cuboid particles have a layered structure.

In some embodiments, the particulate nanocomposite material includes a fraction of the substantially spherical particles have a particle size of less than 200 nm, as determined by transmission electron microscopy (HRTEM).

In another exemplary embodiment, a method for preparing the particulate nanocomposite material is described. The method comprises: forming an mixture by adding an aqueous solution of a magnesium salt and a cadmium salt to a solution in a polar protic solvent of a titanium compound selected from the group including titanium methoxide (Ti$(OMe)_4$), titanium ethoxide (Ti$(OEt)_4$), titanium isopropoxide (Ti$(O-iPr)_4$), titanium n-butoxide (Ti$(O-nBu)_4$), titanium tert-butoxide (Ti$(O-tBu)_4$) and titanium diisopropoxide bis-acetylacetonate; adding an aqueous solution of a 2-ketose into the mixture to form a gel; heating the gel under stirring at a temperature of from about 150° C. to about 300° C. for a sufficient duration to form a dry powder; and, calcining the dry powder at a temperature of from about 500° C. to about 800° C. to form the nanocomposite material.

In some embodiments, the aqueous solution of the magnesium salt and the cadmium salt is added in a dropwise manner into the aqueous solution of the calcium salt, the copper salt and the lead salt.

In some embodiments: the magnesium salt is selected from the group including magnesium sulfate ($MgSO_4$), magnesium nitrate (Mg$(NO_3)_2$), magnesium chloride ($MgCl_2$) and magnesium acetate (Mg$(CH_3COO)_2$); and, the cadmium salt is selected from the group consisting of cadmium sulfate ($CdSO_4$), cadmium nitrate (Cd$(NO_3)_2$), cadmium chloride ($CdCl_2$) and cadmium acetate (Cd$(CH_3COO)_2$).

In some embodiments: the magnesium salt is magnesium nitrate (Mg$(NO_3)_2$); and, the cadmium salt is cadmium nitrate (Cd$(NO_3)_2$).

In some embodiments, the polar protic solvent is selected from the group including $C_1$-$C_4$ alkanols.

In some embodiments, the titanium compound is titanium isopropoxide (Ti$(OiPr)_4$).

In some embodiments, the aqueous solution of the 2-ketose is added in a dropwise manner into the mixture.

In some embodiments, the 2-ketose is selected from the group including dihydroxyacetone, erythrulose, ribulose, xylulose, fructose, psicose, sorbose, tagatose, sedoheptulose and D-manno-octulose.

In some embodiments, the 2-ketose is 1-sorbose.

In some embodiments, the dry powder is calcined at a temperature of from about 600° C. to about 800° C. for a duration of from about 2 hours to about 6 hours to form the nanocomposite material.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
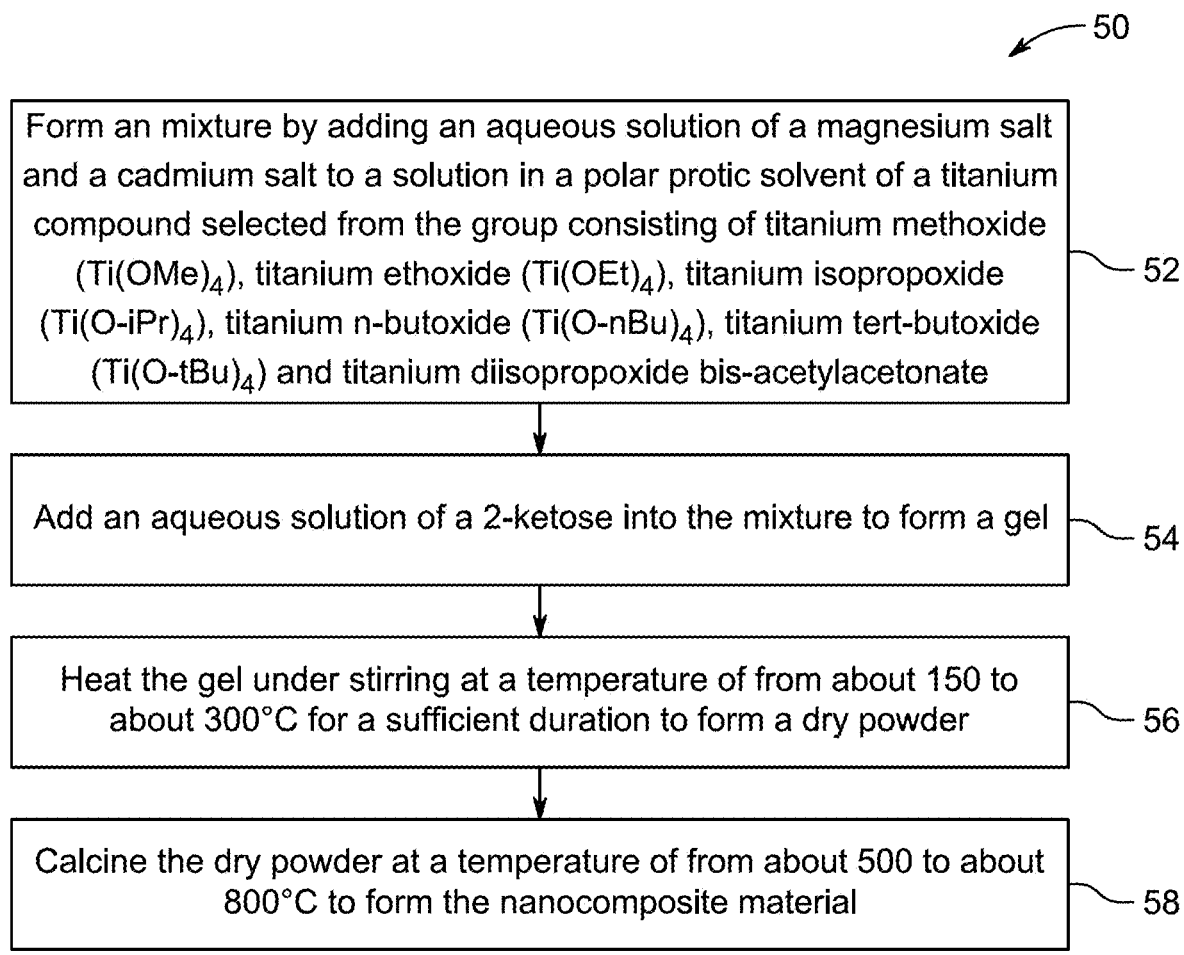
FIG. 1A illustrates an exemplary flow chart for a method of producing a $Mg_{0.6}Ti_{2.4}O_5/MgTiO_3$/Tetragonal $TiO_2$/Orthorhombic $TiO_2$/CdO/C nanocomposite material, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.)±2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles $\alpha$, $\beta$ and $\gamma$ (Blundel et al., 1976, *Protein Crystallography*, Academic Press, the disclosure of which is incorporated herein by reference in its entirety). A crystal is an efficiently packed array of many unit cells.

The term "triclinic crystalline phase" refers to a crystal structure in which the unit cell is characterized by three mutually perpendicular aces of unequal length (a/b/c) wherein further $\alpha \neq \beta \neq \gamma$.

An orthorhombic crystalline phase refers to a crystal structure having three mutually perpendicular axes of unequal lengths ($a \neq b \neq c$) but wherein the crystal lattice forms a rectangular prism where the edges represent the three axes, all intersecting at 90-degree angles ($\alpha = \beta = \gamma =$) 90°.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term "particle" refers to a small object that acts as a whole unit with regard to its transport and properties. As used herein, "nanoparticles"—sometimes contracted herein to NPs-refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant ($\varepsilon$) of more than 5 as measured at 25° C. The determination of dielectric constant ($\varepsilon$) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

The term "dropwise" as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term "sol-gel method" refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term "sol" as used herein, refers to a colloidal suspension of solid particles in a continuous liquid medium.

As used herein, the term "gel" refers to a viscoelastic or semi-solid phase that may form when a sol undergoes a transition to a more structured, three-dimensional network. This transition may occur through polymerization or crosslinking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

As used herein, 'comminuting' refers to process of reducing the average size of solid materials into smaller particles, by crushing, grinding, cutting, vibrating, or other processes.

As used herein, the term 'membrane' refers to a porous structure that is capable of separating components of a homogeneous or heterogeneous fluid. In particular, 'pores' in the sense of a membrane indicate voids permitting fluid communication between different sides of the structure. More particularly in use, when a homogeneous or heterogeneous fluid is passed through the membrane, some components of the fluid can pass through the pores of the membrane into a 'permeate stream', some components of the fluid can be retained by the membrane and can thus accumulate in a 'retentate' and/or some components of the fluid can be rejected by the membrane into a 'rejection stream'. It is not precluded in the present disclosure that both the retenate and the permeate can constitute valuable materials that can be subject to further processing, if required.

Membranes can be of various thicknesses, with homogeneous or heterogeneous structures. The membranes of the present disclosure are neutral or uncharged, and particle transport is considered to be passive, which passive transport can be facilitated by pressure, concentration, and chemical or electrical gradients of the filtration process.

As used herein, the term 'filtration' refers to a mechanical or physical operation that can be employed for the separation of constituents of homogeneous or heterogeneous solutions. Types of filtration can be categorized based on the estimated sizes of chemicals to be separated and can involve particle filtration (>10 micrometer (μm)); microfiltration (0.1-10 μm); ultrafiltration (0.01-0.1 μm); nanofiltration (NF) (0.001-0.01 μm); and, reverse osmosis, or RO (<0.001 μm).

As used herein, the term 'permeate' refers to a filtered liquid that passes through a membrane during a filtration process, leaving behind larger particles or contaminants.

The term 'shear rate' as used herein, references the rate of increase in the velocity of a fluid flowing in the x direction per unit distance in the orthogonal y direction. The shear rate has units of reciprocal time ($s^{-1}$).

The term "sonication" refers to a process that uses sound energy (sonic waves) to agitate particles in a sample. As used herein, the term "ultrasonication" refers to irradiation with ultrasonic waves having a frequency of at least 20 kHz. Without intention to limit the present disclosure, (ultra) sonication may be performed using an (ultra) sonic bath or an (ultra) sonic probe.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

As used herein, the term "organic contaminant" refers to a type of contaminant that contains carbon-based compounds, generally originating from human activities. These contaminants-which might variably be referenced as pollutants—may come from sources such as pesticides, industrial chemicals, plastics, and solvents. They tend to be harmful to the environment and living organisms, as they can be toxic, persistent, and bioaccumulate in ecosystems. Examples include substances such as benzene, dichlorodiphenyl-trichloroethane (DDT), and polychlorinated biphenyls (PCBs). Herein, the organic contaminants may be a dye, a phenol, a polycyclic aromatic hydrocarbon, an herbicide, a pesticide, a persistent organic contaminant, and so on.

The organic contaminant may be a dye, a phenol, a polycyclic aromatic hydrocarbon, an herbicide, a pesticide, a persistent organic contaminant, and so on.

The organic contaminant may be a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxy-anthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3—, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphtacene, pentaphene, picene, and biphenylene.

An herbicide (also known as 'weedkiller') is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, dicloymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic contaminant is a toxic organic chemical that adversely affects human and environmental health, can be transported by wind and water, and can persist for years, decades, or centuries owing to resistance to environmental degradation by natural chemical, biological, or photolytic processes. Persistent organic contaminants are regulated by the United Nations Environment Programme 2001 Stockholm Convention on Persistent Organic Pollutants. Examples of persistent organic contaminants or pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

As used herein, the term 'inorganic contaminants' refers to harmful substances that originate from non-living sources and do not contain carbon-hydrogen bonds. These contaminants typically come from minerals, metals, and salts found in the environment, and they can be harmful to both humans and ecosystems when present in high concentrations. Common examples include heavy metals such as lead, mercury, and arsenic and other inorganic compounds such as nitrates, phosphates, and fluorides.

The present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

The present disclosure is intended to include all hydration states of a given compound or formula, unless otherwise noted or when heating a material.

It is noted that references in the specification to "an embodiment", "some embodiments", "other embodiments" or the like indicate that the embodiment(s) described may include a particular feature, structure, or characteristic, but every embodiment may not necessarily include that particular feature, structure, or characteristic. Moreover, such phrases are not necessarily referring to the same embodiment. Further, when a particular feature, structure, or characteristic is described in connection with an embodiment, it would be within the knowledge of one skilled in the art to affect such feature, structure, or characteristic in connection with other embodiments, whether or not explicitly described, unless clearly stated to the contrary. That is, the various individual elements described below, even if not explicitly shown in a particular combination, are nevertheless contemplated as being combinable or arrangeable with each other to form other additional embodiments or to complement the described embodiment(s).

An aspect of the present disclosure is directed to a $Mg_{0.6}Ti_{2.4}O_5/MgTiO_3$/tetragonal $TiO_2$/orthorhombic $TiO_2$/CdO/C nanocomposite synthesized via a facile sol-gel/combustion method, exhibiting multi-phase crystallinity, enhanced surface morphology, and nanoscale features for advanced industrial and scientific applications.

A particulate nanocomposite material is described. The particulate nanocomposite material, as determined by X-ray diffraction, comprises: elemental carbon; an orthorhombic $TiO_2$ crystalline phase; a tetragonal $TiO_2$ crystalline phase; a cubic CdO crystalline phase; a hexagonal $MgTiO_3$ crystalline phase; and, an orthorhombic $Mg_{0.6}Ti_{2.4}O_5$. In some embodiments, the particulate nanocomposite material has an average volume crystallite size range from about 55 to 65 nm, for example about 56 to about 60 nm, from about 59 to about 61 nm, from about 59 to about 60 nm. In a preferred embodiment, the particulate nanocomposite material has an average crystallite size of 59.07 nm.

In some embodiments, the particulate nanocomposite may possess a morphology comprising nanorectangles, nanotriangles, nanopentagons, nanohexagons, nanoprisms, nanocubes, nanoblocks, nanotoroids, nanobarrels, nanogranules, nanoboxes, nanobeads and mixtures and aggregates thereof. In some embodiments, the particulate nanocomposite material has a heterogeneous morphology, including cuboid particles and agglomerates of substantially spherical particles. In one embodiment, a fraction of the cuboid particles of the particulate nanocomposite material have a layered structure.

In some embodiments, a fraction of the cuboid particles of the particulate nanocomposite material has a particle size greater than about 1 μm. For example, at least 50 wt. % of the cuboid particles of the particulate nanocomposite material have a particle size greater than about 1 μm, such as greater than about 1.2 μm, greater than about 1.4 μm, greater than about 1.6 μm, greater than about 1.8 μm or greater than about 2 μm, as determined by Scanning Electron Microscopy. In some embodiments, a fraction of the substantially spherical particles of the particulate nanocomposite material has a particle size of less than 200 nm. For example, at least 50 wt. % of the spherical particles of the particulate nanocomposite material have a particle size less than about 150 nm, such as less than about 120 nm, or less than about 100 nm, as determined by transmission electron microscopy (HRTEM).

In some embodiments, the particulate nanocomposite material has an atomic concentration of carbon (C) ranging from about 1 to about 5 atom %, for example from 1 to about 4 atom %, or from about 1 to about 3 atom %, based on the total number of atoms in the particulate nanocomposite material. In a preferred embodiment, the particulate nanocomposite material has an atomic concentration of carbon (C) of 1.9 atom % based on the total number of atoms in the particulate nanocomposite material and as determined by energy dispersive X-ray spectroscopy (EDX).

In some embodiments, the particulate nanocomposite material has an atomic concentration of magnesium (Mg) ranging from about 5 to about 15 atom %, for example from about 6 to about 12 atom %, from about 7 to about 11 atom %, or from about 8 to about 10 atom %, based on the total number of atoms in the particulate nanocomposite material. In a preferred embodiment, the particulate nanocomposite material has an atomic concentration of magnesium (Mg) of 9.8 atom % based on the total number of atoms in the particulate nanocomposite material and as determined by EDX.

In some embodiments, the particulate nanocomposite material has an atomic concentration of titanium (Ti) ranging from about 15 to about 30 atom %, for example from about 15 to about 28 atom %, from about 15 to about 26 atom %, or from about 18 to about 24 atom %, based on the total number of atoms in the particulate nanocomposite material. In a preferred embodiment, the particulate nanocomposite material has an atomic concentration of titanium (Ti) of 21.5 atom % based on the total number of atoms in the particulate nanocomposite material and as determined by EDX.

In some embodiments, the particulate nanocomposite material has an atomic concentration of cadmium (Cd) of from about 1 to about 10 atom %, for example from about 1 to about 8 atom %, from about 1 to about 7 atom %, from about 1 to about 5 atom %, or from about 1 to about 4 atom %, based on the total number of atoms in the nanocomposite material. In a preferred embodiment, the nanocomposite has an atomic concentration of cadmium (Cd) of 2.6 atom %, based on the total number of atoms in the nanocomposite material and as determined by EDX.

FIG. 1A illustrates a schematic flow chart of a method 50 of preparing the particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, method 50 includes forming a mixture by adding an aqueous solution of magnesium salt and cadmium salt to a solution in a polar protic solvent of a titanium compound. The aqueous solution of the magnesium salt and the cadmium salt is desirably added in a dropwise manner into the solution of the titanium compound.

Exemplary magnesium salts, which may be used alone or in combination, include but are not limited to magnesium chloride, magnesium sulfate, magnesium bromide, magnesium iodide, magnesium fluoride, magnesium acetate, magnesium carbonate, magnesium citrate, magnesium formate, magnesium lactate, magnesium malate, magnesium tartrate, magnesium phosphate, magnesium pyrophosphate, magnesium hypophosphite, magnesium metasilicate, magnesium tungstate, magnesium perchlorate, magnesium oxalate, magnesium gluconate, magnesium hydroxide, magnesium stearate, magnesium succinate, magnesium benzoate, magnesium borate, magnesium ascorbate, magnesium glycinate, magnesium fumarate, magnesium thiosulfate, and magnesium anthranilate. In some embodiment, the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$). In a preferred embodiment, magnesium salt is magnesium nitrate ($Mg(NO_3)_2$), of which $Mg(NO_3)_2 \cdot 6H_2O$ may be mentioned as an example Exemplary cadmiums salt, which may be used alone or in combination, include but are not limited to cadmium chloride, cadmium sulfate, cadmium carbonate, cadmium acetate, cadmium bromide, cadmium iodide, cadmium fluoride, cadmium formate, cadmium thiocyanate, cadmium oxalate, cadmium chromate, cadmium phosphate, cadmium pyrophosphate, cadmium borate, cadmium citrate, cadmium malate, cadmium tartrate, cadmium perchlorate, cadmium arsenate, cadmium hydroxide, cadmium sulfide, cadmium tungstate, cadmium molybdate, cadmium vanadate, cadmium thiophosphate, cadmium silicate, cadmium tellurate, cadmium selenite, cadmium gluconate, and cadmium benzoate. In some embodiment, the cadmium salt is selected from the group consisting of cadmium sulfate ($CdSO_4$), cadmium nitrate ($Cd(NO_3)_2$), cadmium chloride ($CdCl_2$) and cadmium acetate ($Cd(CH_3COO)_2$). In a preferred embodiment, cadmium salt is cadmium nitrate ($Cd(NO_3)_2$), of which $Cd(NO_3)_2 \cdot 4H_2O$ may be mentioned as an example.

In some embodiments, the titanium salt is selected from the group consisting of titanium methoxide ($Ti(OMe)_4$), titanium ethoxide ($Ti(OEt)_4$), titanium isopropoxide ($Ti(O-iPr)_4$), titanium n-butoxide ($Ti(O-nBu)_4$), titanium tert-butoxide ($Ti(O-tBu)_4$) and titanium diisopropoxide bis-acetylacetonate. In a preferred embodiment, titanium salt comprises or consists of titanium butoxide.

Exemplary polar protic solvents include, but are not limited to, methanol, isopropanol, n-propanol, butanol, isobutanol, tert-butanol, pentanol, hexanol, cyclohexanol, ethylene glycol, propylene glycol, glycerol, formamide, mono($C_1$-$C_4$)alkyl ethers of ethylene glycol, mono($C_1$-$C_4$) alkyl ethers of propylene glycol dimethylformamide (DMF), acetic acid, propionic acid, lactic acid, formic acid, citric acid, phosphoric acid, trifluoroacetic acid, water, ammonia, methylamine, ethylamine, isopropylamine, n-propylamine, butylamine, sec-butylamine, tert-butylamine, diethylamine, dipropylamine, dimethylamine, triethylamine, triethanolamine, n-methylformamide (NMF), n-methylacetamide (NMA), hydrazine, hydroxylamine, and urea. In some embodiments, the polar protic solvent is selected from the group consisting of $C_1$-$C_4$ alkanols. In a preferred embodiment, the polar protic solvent comprises or consists of ethanol.

At step 54, the method 50 includes adding an aqueous solution of a 2-ketose into the mixture to form a gel. The aqueous solution of the 2-ketose is desirably added in a dropwise manner into the mixture. Exemplary 2-ketose compounds, which may be used alone or in combination, include but are not limited to d-fructose, d-psicose, d-tagatose, d-sorbose, d-ribulose, d-xylulose, d-erythrulose, d-allulose, d-sedoheptulose, d-mannoheptulose, 1-fructose, 1-psicose, 1-tagatose, 1-ribulose, 1-xylulose, 1-erythrulose, 1-allulose, 1-sedoheptulose, 1-mannoheptulose, d-altro-heptulose, d-glycero-heptulose, d-manno-octulose, d-glycero-octulose, 1-altro-heptulose, 1-glycero-heptulose, 1-manno-octulose, 1-glycero-octulose, d-threo-heptulose, and 1-threo-heptulose. In some embodiments, the 2-ketose is selected from the group consisting of dihydroxyacetone, erythrulose, ribulose, xylulose, fructose, psicose, sorbose, tagatose, sedoheptulose and D-manno-octulose. In a preferred embodiment, the 2-ketose comprises or consists of 1-sorbose.

At step 56, the method 50 includes heating the gel under stirring at a temperature of about 150 to about 300° C. for a sufficient duration to form a dry powder. In some embodiments, the gel is heated at a temperature in a range from about 150 to about 300° C., for example from about 170 to about 270° C., from about 170 to about 240° C., preferably 175 to about 225° C. In a preferred embodiment, the gel is heated at about 200° C.

At step 58, the method 50 includes calcining the dry powder at a temperature of from about 500 to about 800° C. to form the nanocomposite material. In some embodiments, the solid is calcined at a temperature in a range from about 500 to about 800° C., for example about 550 to about 800° C., from about 600 to about 800° C., from about 650 to about 800° C., from about 700 to about 800° C., or from about 750 to about 800° C. In a preferred embodiment, the solid is calcined at about 700° C. In some embodiments, the solid is calcined for about 2 to about 6 hours, for example from about 2.5 to about 6 hours, from about 2 to about 5 hours, from about 2 to about 4 hours, from about 2.5 to about 4 hours, or from about 2.5 to about 3.5 hours. In a preferred embodiment, the solid is calcined for about 3 hours.

The calcination is carried out by heating it to a high temperature under a restricted supply of ambient oxygen. This is performed to remove impurities or volatile substances and to incur thermal decomposition. Typically, the calcination is carried out in a furnace, preferably equipped with a temperature control system, which may provide a heating rate of up to about 50° C./min, for example up to about 40° C./min, up to about 30° C./min, up to about 20° C./min, up to about 10° C./min, or up to about 5° C./min.

It is not precluded in the present method that the particles directly obtained from the calcination step may be subjected to at least one of comminution, homogenization or classification in order to moderate the particle size distribution thereof.

A method of remediating a polluted aqueous medium is described. The method includes contacting the aqueous medium with an amount of the particulate nanocomposite material. In one embodiment, contacting includes immobilizing inorganic contaminants disposed in the aqueous medium on the amount of particulate nanocomposite material. In one embodiment, remediating includes degrading organic contaminants disposed in the aqueous medium, wherein the aqueous medium is irradiated with actinic irradiation while contacting the amount of the particulate nanocomposite material.

In some embodiments, the contaminants of the aqueous medium comprise organic contaminants selected from the group consisting of benzene, toluene, xylene, phenol, aniline, nitrobenzene, chlorobenzene, formaldehyde, acetaldehyde, acetic acid, benzoic acid, phthalic acid, ethylbenzene, styrene, naphthalene, anthracene, fluoranthene, pyrene, benzo[a]pyrene, polychlorinated biphenyls (PCBs), dichloromethane, chloroform, carbon tetrachloride, trichloroethylene, perchloroethylene, methanol, ethanol, isopropanol, butanol, ethylene glycol, propylene glycol, acrylonitrile, acetamide, acetonitrile, dimethylformamide, diethyl ether, tetrahydrofuran, dioxane, and pentachlorophenol. In some embodiment, the contaminants comprise organic contaminants selected from the group consisting of: polyaromatic hydrocarbons and their halogenated derivatives; phenols and their halogenated derivatives; furanes and their halogenated derivatives; dioxines and their halogenated derivatives; biphenyls and their halogenated derivatives; and, organic dyes.

In some embodiments, the contaminants of the aqueous medium comprise inorganic contaminants selected from the group consisting of arsenic, lead, mercury, cadmium, chromium, nickel, copper, zinc, cobalt, manganese, aluminum, selenium, barium, beryllium, antimony, silver, strontium, uranium, radium, fluoride, chloride, nitrate, nitrite, sulfate, phosphate, cyanide, ammonium, perchlorate, and borate. In some embodiments, the contaminants comprise inorganic contaminants selected from the group consisting of radioactive nuclides, toxic metals, heavy metals, and metalloids.

The methods of either immobilizing inorganic contaminants disposed in an aqueous medium or immobilizing and degrading-under actinic irradiation-organic contaminants disposed in an aqueous medium each require that the aqueous medium to be brought into contact with the particulate nanocomposite material for a sufficient contact time to permit adsorption of the contaminants concerned. Without intention to limit the present disclosure, the contact time of the aqueous medium with the particulate crystalline nanocomposite may be from about 1 to about 120 minutes, for example from about 1 to 90 minutes, from about 1 to 60 minutes, from about 1 to 30 minutes or from about 5 to about 30 minutes. Independently of, or in addition to the aforementioned exemplary contact time, the particulate crystalline nanocomposite may be provided in an amount ranging from about 0.1 to about 5 grams per liter of the aqueous medium for said contacting. For example, the particulate crystalline nanocomposite may be provided in an amount of from about 2 to about 5 grams per liter, from about 3 to about 5 grams per liter or from about 4 to about 5 grams per liter of the aqueous medium.

The aqueous medium may be provided as a static volume in which the nanocomposite material is dispersed. In an alternative embodiment, the aqueous medium may be provided as a fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the particulate nanocomposite material. In this embodiment, the particulate nanocomposite material may need to constrained within a bed or, more particularly, a membrane which the aqueous medium contacts as either a perpendicular or tangential (cross-) flow stream.

Perpendicular flow filtration may be preferred where the aqueous medium feed is characterized by a low concentration of particulates given that there would be reduced residue build up on the surface of the membrane during filtration. Whilst perpendicular flow filtration may be performed continuously, it is preferably performed in a batch or semi-continuous manner, permitting the membrane to be cleaned between use cycles to remove residue build-up.

As noted, membrane separation by tangential flow filtration is not precluded in the present disclosure where the membrane comprises the afore-described particulate nanocomposite material. Conventionally, the retentate stream in tangential flow filtration is recycled. It is also typical for tangential flow filtration to be performed as a continuous process because a constant flow of the feed stream across the surface of the ultrafiltration membrane may prevent the accumulation of residues on the surface thereof.

Where membrane filtration of the aqueous medium is conducted by tangential flow filtration, the feed of the aqueous medium may be represented as a laminar flow and thereby characterized by a shear rate. The shear rate of the aqueous medium in this circumstance may typically be from about 1000 to about 10000 $s^{-1}$, for example from about 2000 to about 10000 $s^{-1}$, from about 2000 to about 8000 $s^{-1}$ or from about 4000 to about 8000 $s^{-1}$.

Independently of the use of direct flow or tangential flow filtration where a membrane comprising the particulate nanocomposite material is utilized, the step of contacting may preferably be performed at a transmembrane pressure differential, specifically a pressure difference between the retentate and permeate side of the membrane. Whilst the tolerance limit of the membrane may be a determinative of the operable transmembrane pressure differential, it is conventional herein to apply a transmembrane pressure differential of from about 50 to about 500 kPa. Exemplary transmembrane pressure differentials of from about 50 to about 400 kPa, about 50 to about 300 kPa or about 100 to about 300 kPa may be mentioned.

The transmembrane pressure differential may be controlled by inter alia: pressurizing the feed stream of the aqueous medium with a gas; adjusting the column height of the feed stream of the aqueous medium above the membrane; through the use of pumps to adjust the flow rate of the fluids on the retentate side of the membrane; through controlling drainage on the permeate side of the membrane; and/or, through the use of suction applied to the permeate side of the membrane.

The transmembrane pressure differential may be maintained at a constant value within the aforementioned ranges during the contacting step. In the alternative, the transmembrane pressure differential may be moderated to provide a constant permeate flow rate: typically in this circumstance, the transmembrane pressure differential will increase during an contacting step or cycle and should, of course, be monitored to ensure that the pressure tolerance limit of the membrane is not exceeded.

The following examples are provided solely for illustration and are not to be construed as limitations of the present disclosure, as many variations thereof are possible without departing from the spirit and scope of the present disclosure.

EXAMPLES

The following examples demonstrate a particulate $Mg_{0.6}Ti_{2.4}O_5/MgTiO_3/$Tetragonal $TiO_2$/Orthorhombic $TiO_2$/CdO/C nanocomposite synthesized using the sol-gel/combustion method for the immobilization of inorganic contaminants and degradation of organic contaminants. The examples are provided solely for illustration and are not to be construed as limitations of the present disclosure, as many variations thereof are possible without departing from the spirit and scope of the present disclosure.

Figure 1B:
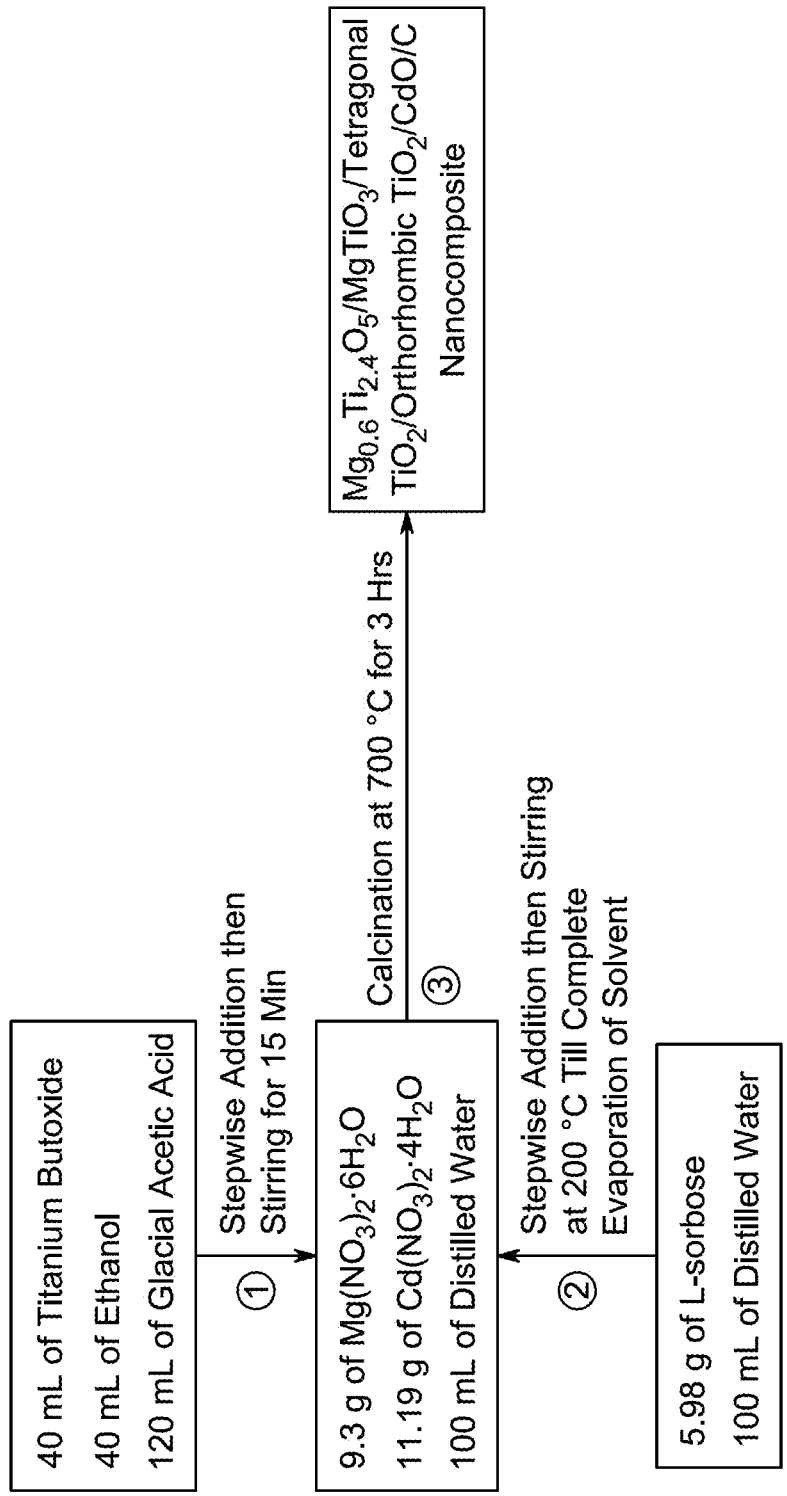
FIG. 1B illustrates an exemplary block diagram depicting the method of producing the nanocomposite material, according to certain embodiments.

Example 1: Synthesis of $Mg_{0.6}Ti_{2.4}O_5/MgTiO_3/$Tetragonal $TiO_2$/Orthorhombic $TiO_2$/CdO/C Nanocomposite The $Mg_{0.6}Ti_{2.4}O_5/MgTiO_3/$Tetragonal $TiO_2$/Orthorhombic $TiO_2$/CdO/C nanocomposite was synthesized using the sol-gel/combustion method, as shown in FIG. 1B. In particular, the method involved dissolving 40 milliliters (mL) of titanium butoxide (TBT, $Ti(OC_4H_9)_4$) in a mixture of 40 mL of ethanol ($C_2H_5OH$) and 120 mL of glacial acetic acid ($CH_3COOH$). A solution of 9.3 g of magnesium nitrate hexahydrate ($Mg(NO_3)_2 \cdot 6H_2O$) and 11.19 g of cadmium nitrate tetrahydrate ($Cd(NO_3)_2 \cdot 4H_2O$) was prepared in 100 mL of distilled water and gradually added to the titanium solution under continuous stirring for 15 minutes. Separately, 5.98 g of L-sorbose was dissolved in 100 mL of distilled water (DW) and then added gradually to the mixture. The mixture was then continuously stirred at 200° C. until the solvent completely evaporated. The resultant powder was calcined at 700° C. for 3 hours to obtain the $Mg_{0.6}Ti_{2.4}O_5/MgTiO_3/$Tetragonal $TiO_2$/Orthorhombic $TiO_2$/CdO/C nanocomposite.

Figure 2:
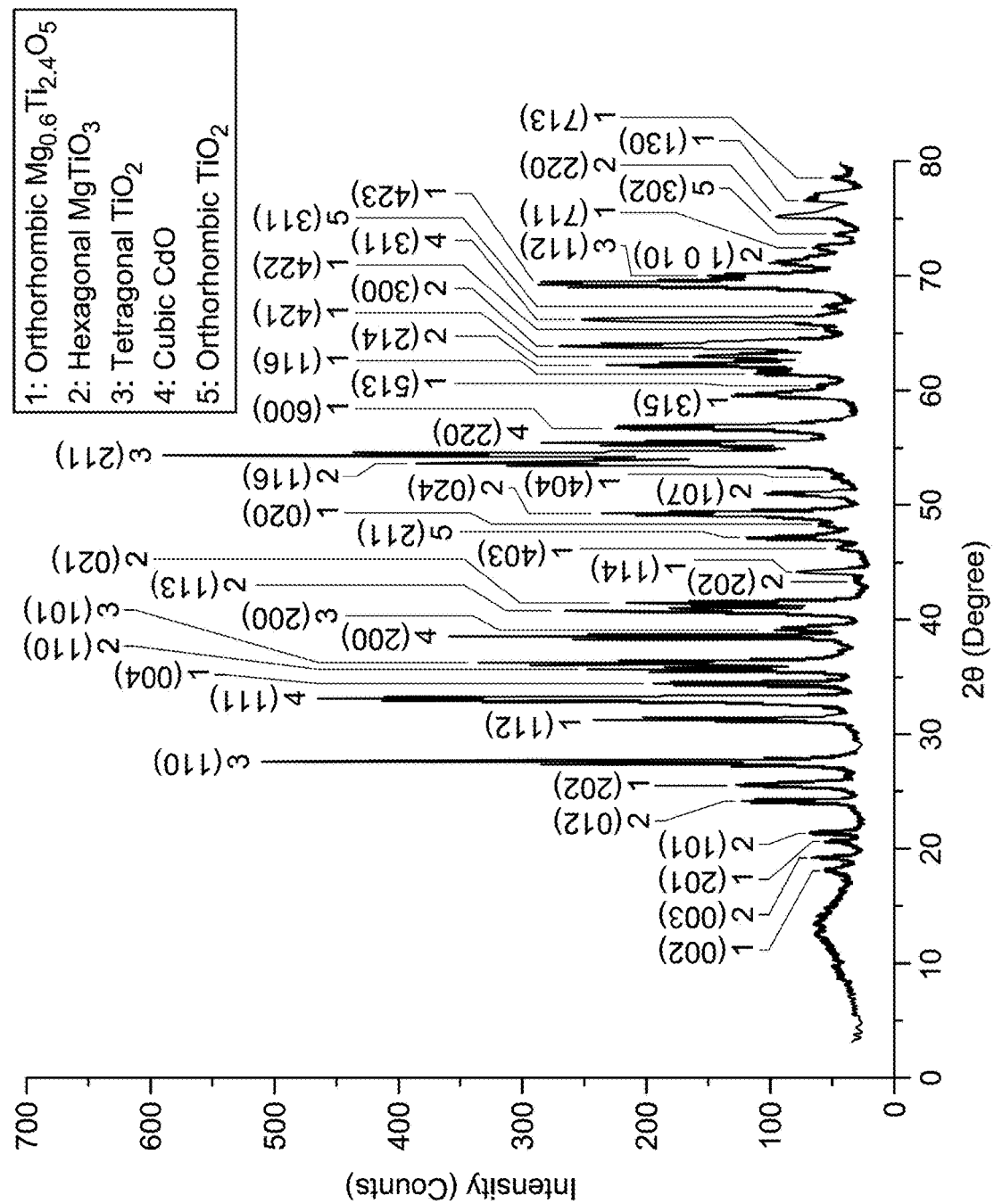
FIG. 2 is a graph depicting X-ray diffraction (XRD) pattern of the nanocomposite material, according to certain embodiments.

The X-ray diffraction (XRD) pattern for the nanocomposite, as shown in FIG. 2, revealed distinct peaks corresponding to the structural and crystallographic properties of its components, as listed in Table 1. The synthesized $Mg_{0.6}Ti_{2.4}O_5/MgTiO_3/$Tetragonal $TiO_2$/Orthorhombic $TiO_2$/CdO/C nanocomposite includes phases of: orthorhombic magnesium titanate ($Mg_{0.6}Ti_{2.4}O_5$) identified using JCPDS Card No. 01-082-1128, the disclosure of which is incorporated herein by reference in its entirety; hexagonal magnesium titanate ($MgTiO_3$) identified using COD No. 9011261, the disclosure of which is incorporated herein by reference in its entirety; tetragonal titanium oxide ($TiO_2$) identified using JCPDS Card No. 00-021-1276, the disclosure of which is incorporated herein by reference in its entirety; cubic cadmium oxide (CdO) identified using JCPDS Card No. 03-065-2908, the disclosure of which is incorporated herein by reference in its entirety; and, orthorhombic titanium oxide ($TiO_2$) identified using JCPDS Card No. 01-072-0021, the disclosure of which is incorporated herein by reference in its entirety. The orthorhombic $Mg_{0.6}Ti_{2.4}O_5$ diffraction peaks were observed at 2θ values of 17.93°, 20.45°, 25.39°, 31.26°, 34.31°, 44.07°, 46.17°, 48.15°, 52.26°, 56.65°, 59.59°, 60.23°, 61.38°, 62.75°, 65.06°, 69.15°, 72.30°, 76.59°, and 78.38°, corresponding to the Miller indices (002), (201), (202), (112), (004), (114), (403), (020), (404), (600), (315), (513), (116), (421), (422), (423), (711), (130), and (713). The hexagonal $MgTiO_3$ showed peaks at 2θ values of 19.09°, 21.19°, 24.02°, 35.46°, 40.71°, 41.33°, 43.34°, 48.99°, 50.89°, 53.61°, 62.02°, 63.80°, 71.03°, and 75.13°, with Miller indices (003), (101), (012), (110), (113), (021), (202), (024), (107), (116), (214), (300), (1 0 10), and (220). The tetragonal $TiO_2$ phase diffraction peaks were observed at 2θ values of 27.49°, 36.09°, 39.03°, 54.35°, and 69.77°, with Miller indices (110), (101), (200), (211), and (112). The cubic CdO exhibits peaks at 32.83°, 38.30°, 55.30°, and 65.99°, corresponding to Miller indices (111), (200), (220), and (311). The orthorhombic $TiO_2$ has peaks at 2θ values of 47.11°, 67.16°, and 73.45°, with Miller indices (211), (311), and (302). The nanocomposite was characterized by an average crystallite size of 59.07 nm, indicating nanoscale dimensions suitable for its intended applications.

observed in the HRTEM image validated the successful synthesis of the nanocomposite, which was essential for enhancing its functional properties and broadening its potential applications.

The aspect of the present disclosure provides a $Mg_{0.6}Ti_{2.4}O_5$/$MgTiO_3$/Tetragonal $TiO_2$/Orthorhombic $TiO_2$/CdO/C nanocomposite synthesized using a facile sol-gel/combustion method. The controlled synthesis of a nanocomposite ensured a well-defined and homogeneous multi-phase composition, nanoscale particle size, and a combination of unique crystal structures, including orthorhombic, hexagonal, tetragonal, and cubic phases. The incorporation of

TABLE 1

Structural and crystallographic properties of the nanocomposite components as determined by XRD.

| Components of the nanocomposite | | | | | Average crystallite size of the nanocomposite (nm) |
|---|---|---|---|---|---|
| Phase | Chemical name | Card No. | Crystal system | Phase | |
| $Mg_{0.6}Ti_{2.4}O_5$ | Magnesium titanate | JCPDS-01-082-1128 | Orthorhombic | $Mg_{0.6}Ti_{2.4}O_5$ | 59.07 |
| $MgTiO_3$ | Magnesium titanate | COD-9011261 | Hexagonal | $MgTiO_3$ | |
| $TiO_2$ | Titanium oxide | JCPDS-00-021-1276 | Tetragonal | $TiO_2$ | |
| CdO | Cadmium oxide | JCPDS-03-065-2908 | Cubic | CdO | |
| $TiO_2$ | Titanium oxide | JCPDS-01-072-0021 | Orthorhombic | $TiO_2$ | |

Figure 3:
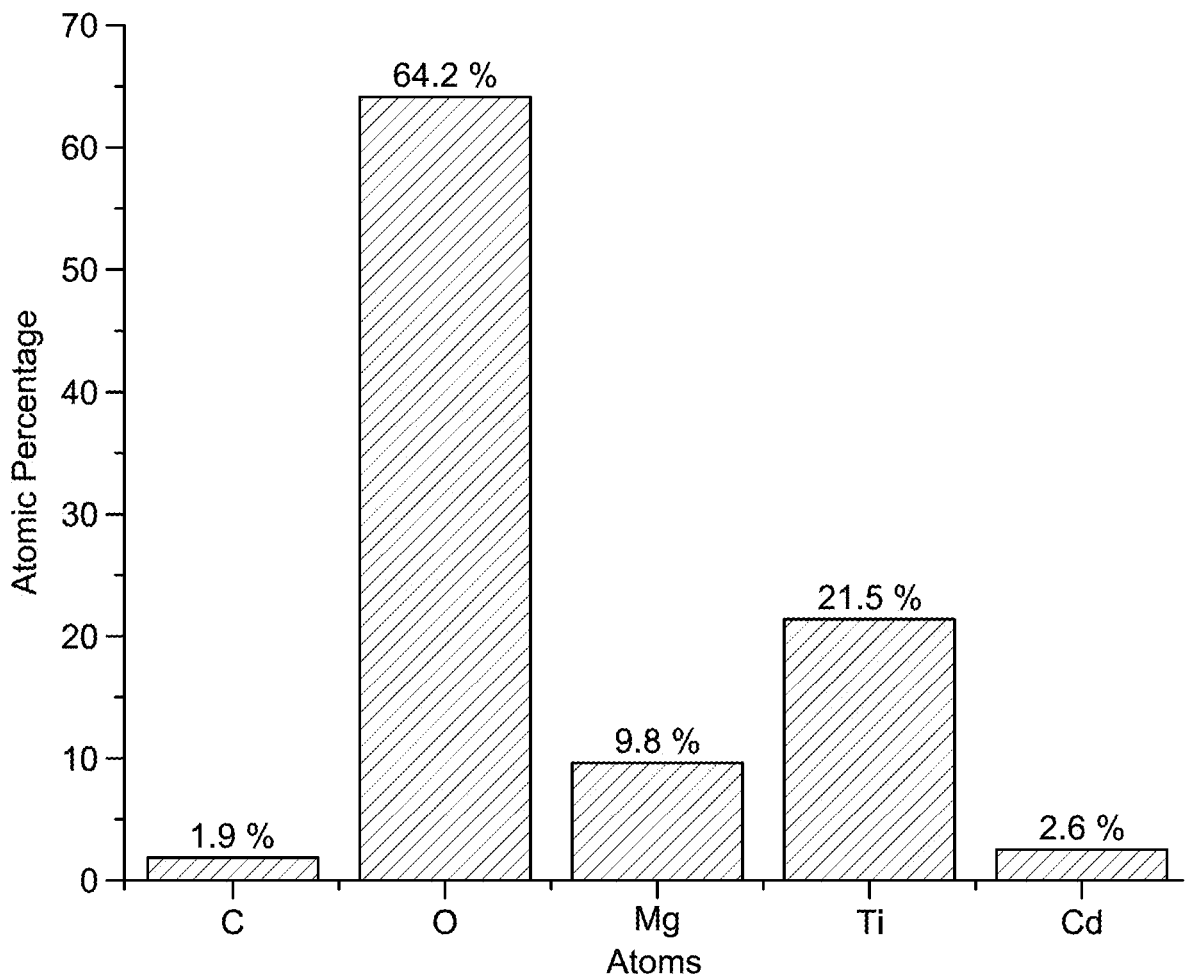
FIG. 3 is a graph depicting the distribution of atomic percentages of elements in the nanocomposite material, as determined by energy dispersive X-ray spectroscopy (EDX), according to certain embodiments.

Further, FIG. 3 illustrates the elemental distribution of the $Mg_{0.6}Ti_{2.4}O_5$/$MgTiO_3$/Tetragonal $TiO_2$/Orthorhombic $TiO_2$/CdO/C nanocomposite, as determined by energy dispersive X-ray spectroscopy (EDX). The elemental composition revealed the dominance of oxygen (O) at 64.2%, followed by titanium (Ti) at 21.5%, magnesium (Mg) at 9.8%, cadmium (Cd) at 2.6%, and carbon (C) at 1.9%. The presence of carbon was attributed to the use of L-sorbose as a fuel during the sol-gel/combustion synthesis method. L-sorbose decomposes under high-temperature combustion, which upon decomposition during calcination, may leave residual carbon in the final product. The observed elemental distribution highlighted the successful incorporation of the constituent elements into the nanocomposite structure, supporting its synthesis and purity.

Figure 4:
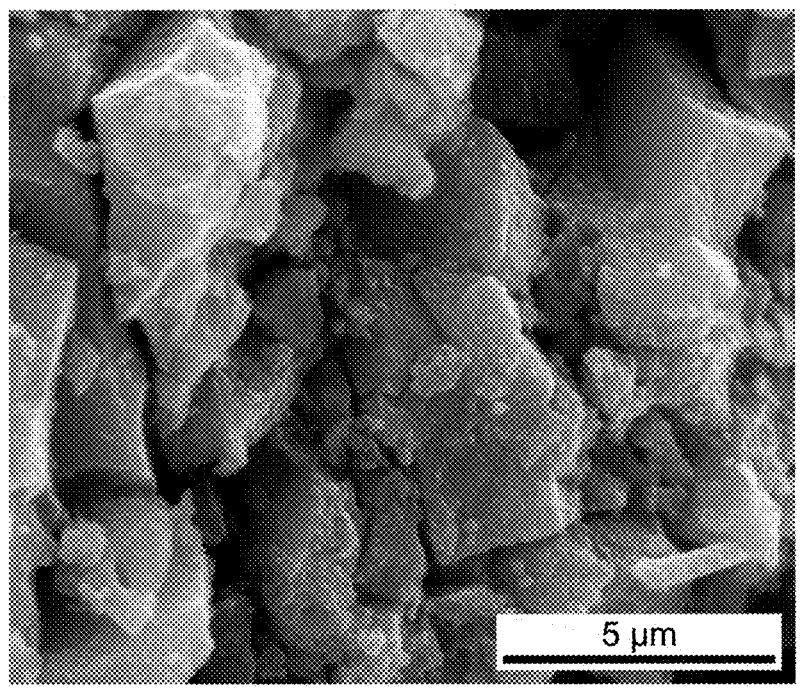
FIG. 4 shows a scanning electron microscope (SEM) image of the nanocomposite material, at a resolution of 5 micrometer (µm), according to certain embodiments.

The scanning electron microscope (SEM) image of the synthesized $Mg_{0.6}Ti_{2.4}O_5$/$MgTiO_3$/Tetragonal $TiO_2$/Orthorhombic $TiO_2$/CdO/C nanocomposite revealed distinct morphological features with a heterogeneous distribution, as shown in FIG. 4. The SEM image demonstrated a heterogeneous structure composed of irregularly shaped particles with block-like and sheet-like morphologies. The block-like structures exhibited well-defined edges and corners, while the sheet-like structures displayed layered and plate-like appearances. These features indicated the successful synthesis of the nanocomposite with a mixed morphology.

Figure 5:
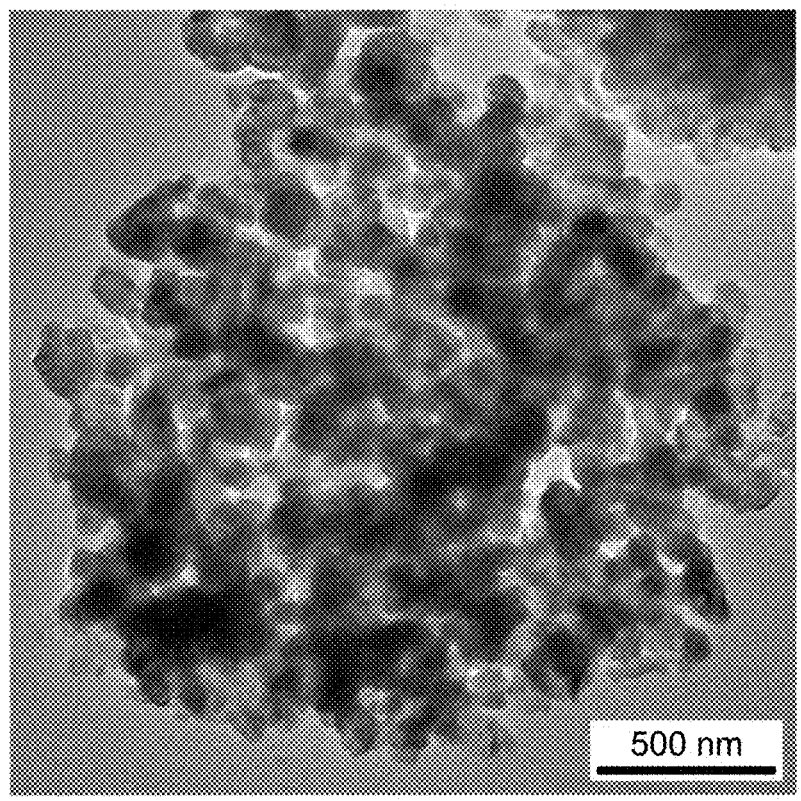
FIG. 5 shows a high-resolution transmission electron microscope (HRTEM) image of the nanocomposite material, at a resolution of 500 nanometer (nm), according to certain embodiments.

Further, FIG. 5 depicts the high-resolution transmission electron microscope (HRTEM) image of the synthesized nanocomposite, highlighting its nanoscale morphology and structural features. The image revealed a cluster of nearly spherical particles with a uniform distribution and slight agglomeration, confirming the nanoscale nature of the material. The nanocomposite exhibited an average particle diameter of 89.61 nm, indicating the formation of nanoparticles with consistent size and shape. The spherical morphology carbon derived from the decomposition of L-sorbose during combustion further enhances the structural integrity and functional versatility of the material. By overcoming the challenges of inadequate phase stability, inconsistent morphology, and low synthesis efficiency, the present disclosure addresses challenges associated with traditional methods by offering a facile, cost-effective, and scalable approach for synthesizing high-performance nanocomposites, making it highly suitable for a range of industrial and scientific applications and marking a significant advancement in materials science.

According to the present disclosure an exemplary $Mg_{0.6}Ti_{2.4}O_5$/$MgTiO_3$/Tetragonal $TiO_2$/Orthorhombic $TiO_2$/CdO/C nanocomposite was synthesized using an efficient and scalable sol-gel/combustion approach. The XRD confirmed a multi-phase composition with orthorhombic, hexagonal, tetragonal, and cubic crystal systems, demonstrating a high degree of crystallinity with an average crystallite size of 59.07 nm. The SEM images highlight a mixed morphology of block-like and sheet-like structures, underscoring the heterogeneity and enhanced surface area of the nanocomposite. EDX confirmed the elemental composition, with oxygen at 64.2%, titanium at 21.5%, magnesium at 9.8%, cadmium at 2.6%, and carbon at 1.9%, with the presence of carbon attributed to the decomposition of L-sorbose during combustion. HRTEM further validated the nanoscale features, showing nearly spherical particles with a uniform distribution and an average particle diameter of 89.61 nm. The present disclosure addressed significant gaps in existing technologies by introducing an innovative, multi-functional material with improved structural and morphological properties, making it a promising candidate for diverse industrial and scientific applications.

The synthesized $Mg_{0.6}Ti_{2.4}O_5$/$MgTiO_3$/Tetragonal $TiO_2$/Orthorhombic $TiO_2$/CdO/C nanocomposite holds potential for advanced water treatment applications, including the immobilization and removal of inorganic contaminants, such as heavy metals, and organic contaminants from contaminated water. The nanocomposite might find further utility in energy storage devices, such as supercapacitors or batteries, due to its multi-phase structure and enhanced conductivity. Additionally, the unique photocatalytic and optical properties make it suitable for environmental remediation and photovoltaic applications.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of remediating a contaminated aqueous medium, the method comprising contacting the aqueous medium with an amount of a particulate nanocomposite material comprising, as determined by X-ray diffraction:
    elemental carbon;
    an orthorhombic $TiO_2$ crystalline phase;
    a tetragonal $TiO_2$ crystalline phase;
    a cubic CdO crystalline phase;
    a hexagonal $MgTiO_3$ crystalline phase; and,
    an orthorhombic $Mg_{0.6}Ti_{2.4}O_5$,
wherein, based on the total number of atoms in the nanocomposite material and as determined by energy dispersive X-ray spectroscopy (EDX):
    the atomic concentration of carbon (C) is from about 1 to about 5 atom %;
    the atomic concentration of magnesium (Mg) is from about 5 to about 15 atom %;
    the atomic concentration of titanium (Ti) is from about 15 to about 30 atom %; and,
    the atomic concentration of cadmium (Cd) is from about 1 to about 10 atom %.

2. The method according to claim 1, wherein contacting comprises immobilizing inorganic contaminants disposed in the aqueous medium on the amount of particulate nanocomposite material.

3. The method according to claim 1, wherein remediating comprises degrading organic contaminants disposed in the aqueous medium, and further wherein the aqueous medium is irradiated with actinic irradiation while contacting the amount of the particulate nanocomposite material.

4. The method according to claim 1, wherein the amount of the particulate nanocomposite material is from about 0.05 to about 1 wt. %, based on the weight of the aqueous medium.

5. The method according to claim 1, wherein the aqueous medium is provided as a static volume in which the amount of the particulate nanocomposite material is dispersed.

6. The method according to claim 1, wherein the aqueous medium is provided as a flow which contacts the amount of the particulate nanocomposite material.

7. The method according to claim 6, wherein at least a fraction of the amount of the particulate nanocomposite material is retained within a membrane and the aqueous medium contacts the membrane as a perpendicular flow stream.

8. The method according to claim 6, wherein at least a fraction of the amount of particulate nanocomposite material is retained within a membrane and the aqueous medium contacts the membrane as a tangential flow stream.

9. The method according to claim 1, wherein based on the total number of atoms in the nanocomposite material:
    the atomic concentration of carbon (C) is from about 1 to about 3 atom %;
    the atomic concentration of magnesium (Mg) is from about 6 to about 12 atom %;
    the atomic concentration of titanium (Ti) is from about 18 to about 24 atom %; and,
    the atomic concentration of cadmium (Cd) is from about 1 to about 6 atom %.

10. The method according to claim 1, wherein the particulate nanocomposite material has a volume average crystallite size, as determined by X-ray diffraction, of from about 55 to about 65 nm.

11. The method according to claim 1, wherein the particulate nanocomposite material has a heterogeneous morphology comprising cuboid particles and agglomerates of substantially spherical particles.

12. The method according to claim 11, wherein a fraction of the cuboid particles of the particulate nanocomposite material have a particle size greater than about 1 µm, as determined by Scanning Electron Microscopy.

13. The method according to claim 11, wherein a fraction of the cuboid particles of the particulate nanocomposite material have a layered structure.

14. The method according to claim 11, wherein a fraction of the substantially spherical particles of the particulate nanocomposite material have a particle size of less than 200 nm, as determined by transmission electron microscopy (HRTEM).

15. The method according to claim 1, wherein the particulate nanocomposite material is obtained by:
    forming an mixture by adding an aqueous solution of a magnesium salt and a cadmium salt to a solution in a polar protic solvent of a titanium compound selected from the group consisting of titanium methoxide (Ti(OMe)$_4$), titanium ethoxide (Ti(OEt)$_4$), titanium isopropoxide (Ti(O-iPr)$_4$), titanium n-butoxide (Ti(O-nBu)$_4$), titanium tert-butoxide (Ti(O-tBu)$_4$) and titanium diisopropoxide bis-acetylacetonate;
    adding an aqueous solution of a 2-ketose into the mixture to form a gel;
    heating the gel under stirring at a temperature of from about 150 to about 300° C. for a sufficient duration to form a dry powder; and,
    calcining the dry powder at a temperature of from about 500 to about 800° C. to form the nanocomposite material.

16. The method according to claim 15, wherein:
    the aqueous solution of the magnesium salt and the cadmium salt is added in a dropwise manner into the solution of the titanium compound; and/or,
    the aqueous solution of the 2-ketose is added in a dropwise manner into the mixture.

17. The method according to claim 15, wherein:
    the magnesium salt is selected from the group consisting of magnesium sulfate (MgSO$_4$), magnesium nitrate (Mg(NO$_3$)$_2$), magnesium chloride (MgCl$_2$) and magnesium acetate (Mg(CH$_3$COO)$_2$);
    the cadmium salt is selected from the group consisting of cadmium sulfate (CdSO$_4$), cadmium nitrate (Cd(NO$_3$)$_2$), cadmium chloride (CdCl$_2$) and cadmium acetate (Cd(CH$_3$COO)$_2$); and,
    the 2-ketose is selected from the group consisting of dihydroxyacetone, erythrulose, ribulose, xylulose, fructose, psicose, sorbose, tagatose, sedoheptulose and D-manno-octulose.

18. The method according to claim 17, wherein the 2-ketose is 1-sorbose.

19. The method according to claim 15, wherein the polar protic solvent is selected from the group consisting of $C_1$-$C_4$ alkanols.

20. The method according to claim 15, wherein the dry powder is calcined at a temperature of from about 600 to about 800° C. for a duration of from about 2 to about 6 hours to form the nanocomposite material.

\* \* \* \* \*